Aug. 19, 1924.  
A. H. STEBBINS  
CONCENTRATOR  
Filed April 11, 1922
1,505,742
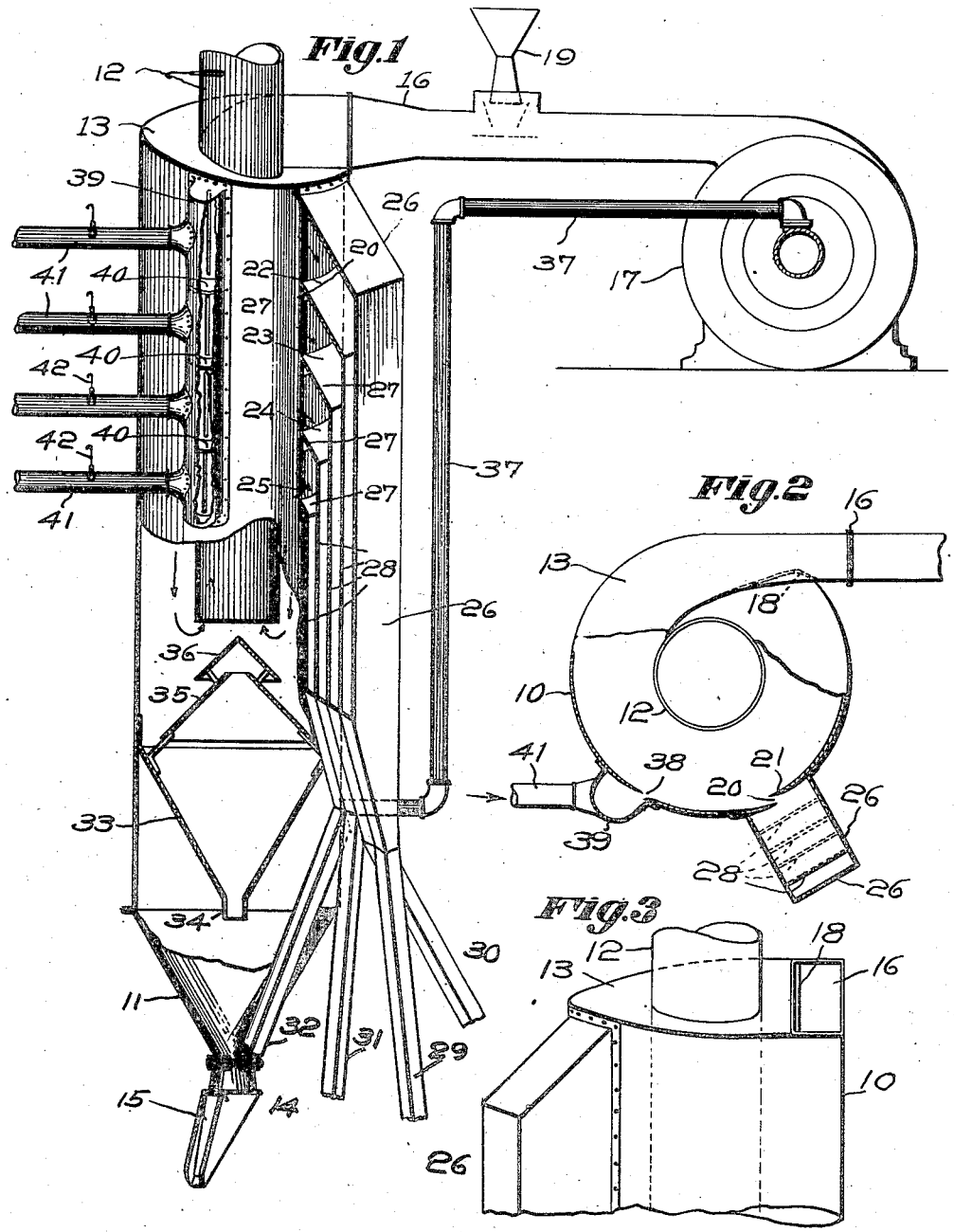

Patented Aug. 19, 1924.

1,505,742

UNITED STATES PATENT OFFICE.

ALBERT H. STEBBINS, OF LOS ANGELES, CALIFORNIA.

CONCENTRATOR.

Application filed April 11, 1922. Serial No. 551,596.

*To all whom it may concern:*

Be it known that I, ALBERT H. STEBBINS, a citizen of the United States, residing at Los Angeles, in the county of Los Angeles and State of California, have invented an Improvement in Concentrators, of which the following description, in connection with the accompanying drawings, is a specification, like characters on the drawings representing like parts.

This invention relates to concentrators of the type in which the materials to be treated are subject to the action of whirling air currents which serve to throw the heavier particles outwardly by centrifugal force so that they may be removed from the lighter particles.

The concentrator of the present invention is well adapted for use in the treatment of ores to separate the values from the usual impurities. In most ores the values are distributed throughout a relatively large amount of impurities or foreign matter, and as a result the values obtained constitute a relatively small portion of the mass of materials treated. It is therefore important to reduce as far as practical the labor involved in treating this mass of materials, and at the same time to remove the values as completely as possible.

In ore treating mills it is customary to concentrate the materials at various stages of the ore treatment, and the materials are commonly subjected to the first concentration operation while the particles are relatively large in size so that some of the values or concentrates may be removed at this stage, and other values or concentrates are removed at succeeding stages as the materials are reduced in size.

The present invention is designed more particularly for the treatment of ores or other materials in a finely divided condition where it is desired to separate the materials in accordance with their differences in specific gravity; and an important feature of the invention consists in a drum or container in which the materials are caused to whirl so that the heavier particles are thrown outwardly, that they may be removed from the drum at different points lengthwise thereof in accordance with the differences in specific gravity.

Another important feature of the invention resides in means for directing air into the drum from a lateral wall thereof to deflect inwardly the lighter materials that may approach the discharge opening for the heavier materials.

Other features of the invention and novel combination of parts in addition to the above will be hereinafter described in connection with the accompanying drawings which illustrate one good practical form thereof.

In the drawings:

Fig. 1 is a side elevation with parts shown in section of a concentrator constructed in accordance with the present invention;

Fig. 2 is a top plan view of Fig. 1 with parts shown in section; and

Fig. 3 is a side view of the upper part of Fig. 1 showing the air inlet conduit in section.

In the embodiment of the invention shown in the drawings a drum or container 10 is provided preferably supported in an upright position and having a material receiving hopper 11 at its lower end. Within the drum 10 is provided an air discharge tube 12 extending lengthwise thereof and passing out through the upper end 13 of the drum. The tube 12 preferably extends centrally within the drum 10 throughout a substantial portion of the length of the latter and may have its lower end open to admit air from the interior of the drum, as indicated by the arrows. The materials that collect within the hopper 11 may be discharged through the spout 14 which preferably is provided with a trap 15 adapted to prevent air from escaping through the spout.

The material to be treated and the air bearing the same, should whirl about the interior of the drum 10 within the space between the tube and drum with a downward spiral movement so that the heavier particles are thrown outwardly by centrifugal force. Various means may be provided for imparting the desired movement to the air and materials carried thereby, and in the construction shown a conduit 16 is provided extending tangentially into the drum 10 as shown in Fig. 2, and the cover 13 preferably has a spiral configuration that serves to direct the air downward within the drum. A fan 17 or other suitable means may be provided to force air through the conduit 16 into the drum, and the air should enter the drum as close to the wall thereof as practical to impart a strong whirling movement thereto. The conduit 16 is therefore shown as rectangular in cross-section (see Fig. 3) and a projection 18 extending inwardly slightly from one wall of the conduit serves to increase the velocity of the air as it enters the drum. The materials to be treated may be introduced into the air within the conduit 16 by means of a hopper 19, or may be suspended in the air passing through the fan 17.

As the air whirls about the interior of the drum 10 the heavier particles are thrown outwardly toward the walls of the drum while the lighter particles will occupy the space nearer the axis of the drum. To remove these heavier particles, a slot 20 is provided within a wall of the drum 10 extending lengthwise thereof so that the heavier particles traveling adjacent the wall may escape therethrough, and a lip 21 may be provided at the slot to extend into the drum slightly and direct the particles traveling close to the wall through the slot.

The heaviest particles within the whirling air will be thrown outwardly against the walls of the drum near the upper end thereof, and the lighter particles will move outwardly less promptly. As a result the particles discharged through the slot may be graded by introducing the particles passing through different portions of the slot into different receptacles, and to this end a series of receptacles 22, 23, 24 and 25 are provided lengthwise of the slot. These receptacles are conveniently formed by providing a casing 26 extending lengthwise of the drum 10 over the slot 20 and having partitions 27 therein dividing the casing into the different receptacles. To discharge materials from the different receptacles, downwardly extending walls 28 are provided within the casing 26 to form conduits provided at their lower ends with the discharge spouts 29, 30, 31 and 32.

Some of the materials that do not pass through the slot 20 will move downwardly along the walls of the drum 10 to collect in the hopper 11 at the lower end of the drum. It is desirable to prevent the downwardly whirling air from reaching this hopper and to this end, in the construction shown, an inverted cone 33 is provided within the drum to close off the lower end from the upper part of the drum, and the cone has a small opening 34 through which the materials pass. The downward movement of the air may be further arrested by an upright cone 35 supported in spaced relation to the cone 33 and the air that crowds into the cones 33 and 35 may escape therefrom through the opening in the upper end of the cone 35. A cap 36 prevents air from passing directly into the open end of the tube 11 as it escapes from the cone 35.

In some cases it may be desirable to reduce the air pressure in that portion of the drum which lies below the cone 33, and to this end a pipe 37 may be provided leading to the suction side of the fan 17.

The heavier materials that are thrown outwardly within the drum 10 toward the walls thereof may carry with them some of the lighter particles. It is desirable to prevent these lighter particles from escaping through the slot 20 with the heavier materials, and to this end, means is provided for directing air inwardly from a lateral wall of the drum to deflect the lighter particles away from the discharge slot 20. The deflecting air may be delivered into the drum through one or more slots 38 disposed in spaced relation to the slot 20, and since it may be desirable to vary the strength of the air entering the different slots 38, the slots are provided with different air supply means. In the construction shown a casing 39 is provided upon the outer surface of the drum over the slots 38, and this casing is divided into compartments by partitions 40. Each compartment is supplied with air by a pipe 41 and the flow of air in each pipe is controlled by a gate 42. The arrangement is such that blasts of air may be introduced through the different slots 39, and the strength of the air may be controlled so that it will deflect the lighter materials away from the discharge slot 20, while it will not be strong enough to prevent the heavier particles from escaping through this slot.

The number of receptacles 22 may be varied as desired and each receptacle will receive a different grade of material from the discharge slot 20. The very fine materials not discharged through the slot 20 or released by the air to settle in the hopper 11 will pass out of the concentrator with the air that escapes through the tube 12. The discharge spouts 29, 30, 31 and 32 preferably lead into closed receptacles which prevent air from escaping through these spouts.

What is claimed is:

1. A concentrator comprising, in combination, an upright drum having a material discharge slot extending a substantial distance lengthwise of a side wall thereof, a tube mounted centrally within the drum and extending through an end thereof for conducting from the drum air from which the heavier particles have been removed, means for delivering air bearing the materials to be treated into the drum at an end thereof with a whirling movement around said tube and lengthwise of the drum to throw outwardly by centrifugal force the heavier particles so that they will travel around the drum adjacent the wall thereof and escape from the drum through said slot in the direction in which the particles are whirling, a lip at said slot and extending in a direction to direct the whirling materials through the slot, and means for forcing an additional supply of air into the drum through a side wall thereof and in the form of a jet to deflect from said slot the lighter materials that may approach the slot.

2. A concentrator comprising, in combination, an upright drum having a material discharge slot extending a substantial distance lengthwise of a wall thereof, a tube mounted centrally within the drum and extending through the upper end thereof for conducting from the drum air from which the heavier particles have been removed, a conduit for delivering air bearing the materials to be treated into the upper part of the drum with a downward whirling movement about said tube to throw outwardly by centrifugal force the heavier particles so that they will travel around the drum adjacent the wall thereof and escape through said slot, a series of receptacles for receiving materials from different portions of said slot so that different grades of the materials will enter different receptacles, and means for forcing an additional supply of air into the drum through a side wall thereof and in the form of a jet to deflect from said slot the lighter materials that may approach the slot.

3. A concentrator comprising, in combination, an upright drum having a material discharge slot extending a substantial distance lengthwise of a side wall thereof, a tube mounted centrally within the drum and extending through an end thereof for conducting from the drum air from which the heavier particles have been removed, means for delivering air bearing the materials to be treated into the drum at an end thereof with a whirling movement around said tube and lengthwise of the drum to throw outwardly by centrifugal force the heavier particles so that they will travel around the drum adjacent the wall thereof and escape from the drum through said slot in the direction in which the particles are whirling, means for separating the grades of materials that pass through different parts of the slot lengthwise thereof, and a lip at said slot and extending in a direction to direct through the slot the heavier materials that are carried by the air around the drum adjacent the wall of the drum.

4. A concentrator comprising, in combination, an upright drum having a material discharge slot extending a substantial distance lengthwise of a wall thereof, a tube mounted centrally within the drum and extending through the upper end thereof for conducting from the drum air from which the heavier particles have been removed, a conduit for delivering air bearing the materials to be treated into the upper part of the drum with a downward whirling movement about said tube to carry the heavier particles thrown outwardly by centrifugal force through the slot and out of the drum in the direction in which the air is whirling, means for receiving the materials that pass through said slot, and means disposed at one side of said slot for forcing jets of air into the drum through a lateral wall thereof to deflect from said slot the lighter materials that may approach the slot.

5. A concentrator comprising, in combination, an upright drum having a material discharge slot extending a substantial distance lengthwise of a wall thereof, a tube mounted centrally within the drum and extending through the upper end thereof for conducting from the drum air from which the heavier particles have been removed, a conduit for delivering air bearing the materials to be treated into the upper part of the drum with a downward whirling movement about said tube to carry the heavier particles thrown outwardly by centrifugal force through the slot and out of the drum in the direction in which the air is whirling, means for receiving the materials that pass through said slot, means for forcing different jets of air into the drum at points lengthwise thereof through a lateral wall to deflect from said slot the lighter materials that may approach the slot, and independent means for regulating the strength of the air delivered by the different air jets.

6. A concentrator comprising, in combination, an upright drum having a material discharge slot extending a substantial distance lengthwise of a wall thereof, a tube mounted centrally within the drum and extending through the upper end thereof for conducting from the drum air from which the heavier particles have been removed, a conduit for delivering air bearing the materials to be treated into the upper part of the drum with a downward whirling movement about said tube to carry the heavier particles thrown outwardly by centrifugal force through the slot and out of the drum in the direction in which the air is whirling, means for receiving the materials that pass through said slot, means located at one side of said slot for forcing jets of air into the drum through a lateral wall thereof to deflect from said slot the lighter materials that may approach the slot, and baffle means in the lower portion of the drum for arresting the downward movement of the air within the drum.

In testimony whereof, I have signed my name to this specification.

ALBERT H. STEBBINS.